April 8, 1947.  H. L. NEEDHAM  2,418,522
HAND TRUCK FOR TRANSPORTING CAR WHEELS
Filed Feb. 27, 1946  3 Sheets—Sheet 1
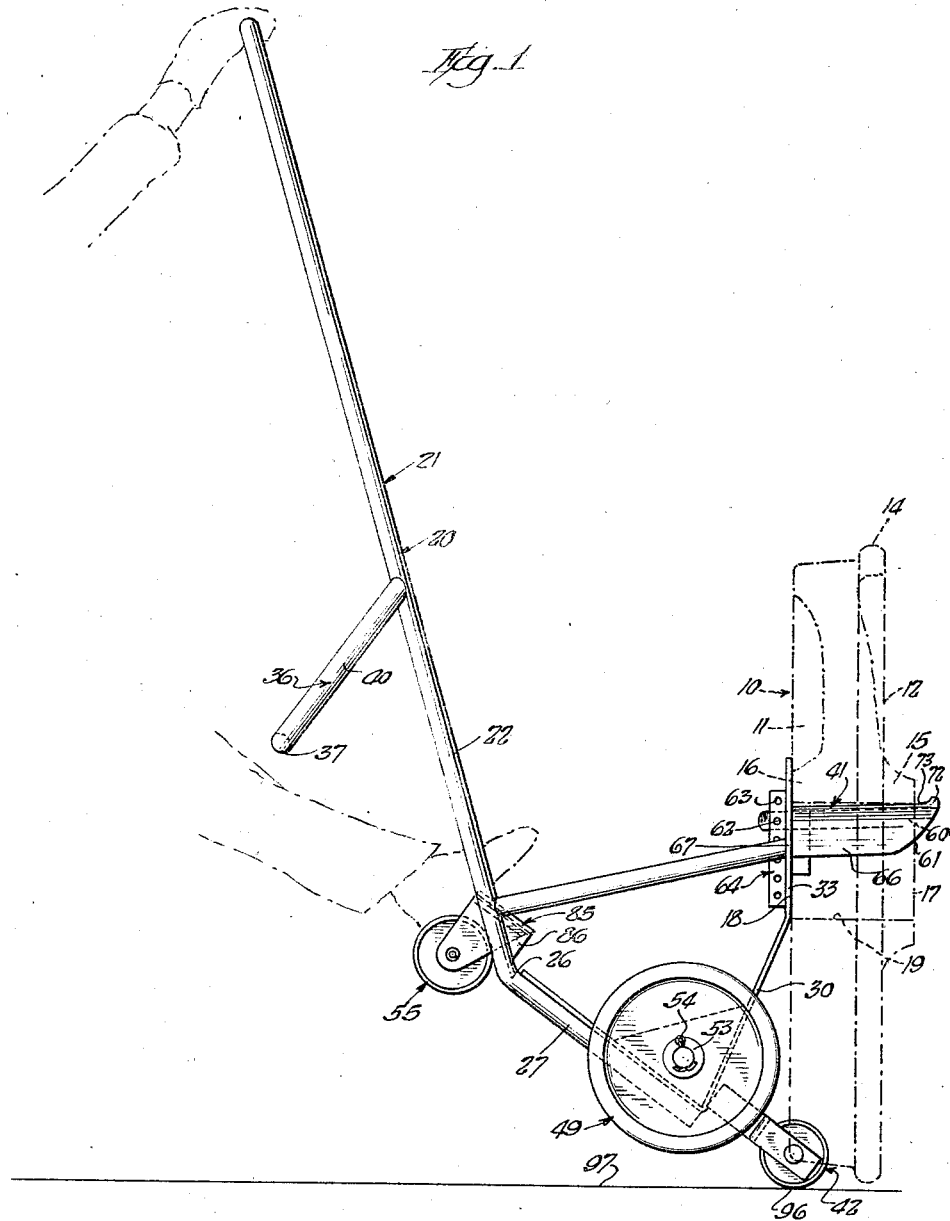
Inventor
Houghton L. Needham
By Robert H. Wendt
Atty.

April 8, 1947. H. L. NEEDHAM 2,418,522
HAND TRUCK FOR TRANSPORTING CAR WHEELS
Filed Feb. 27, 1946 3 Sheets-Sheet 2
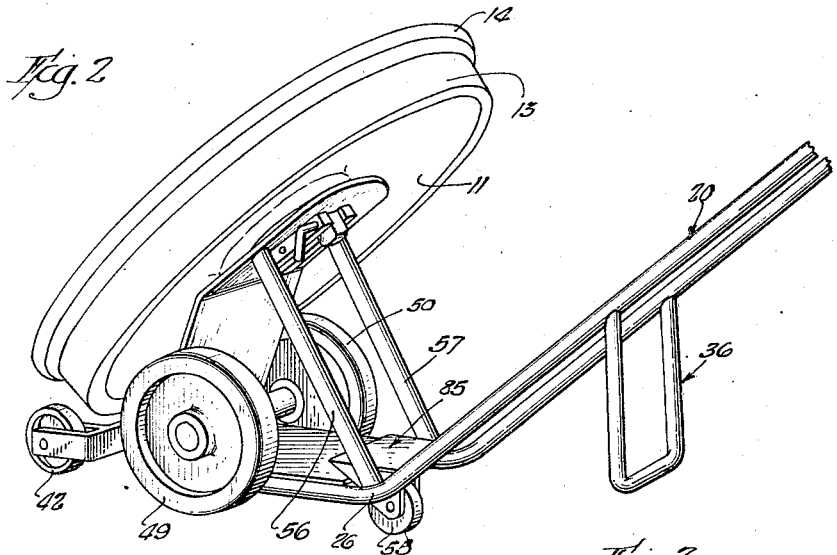
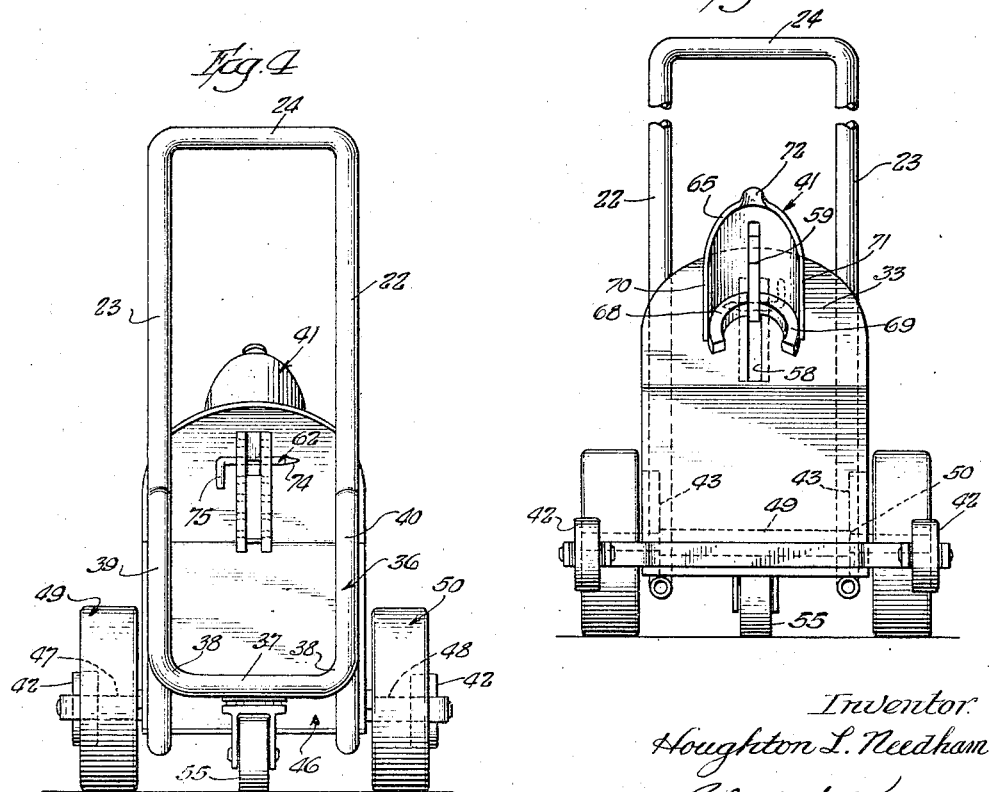
Inventor
Houghton L. Needham
By Robert H. Wendt
Atty.

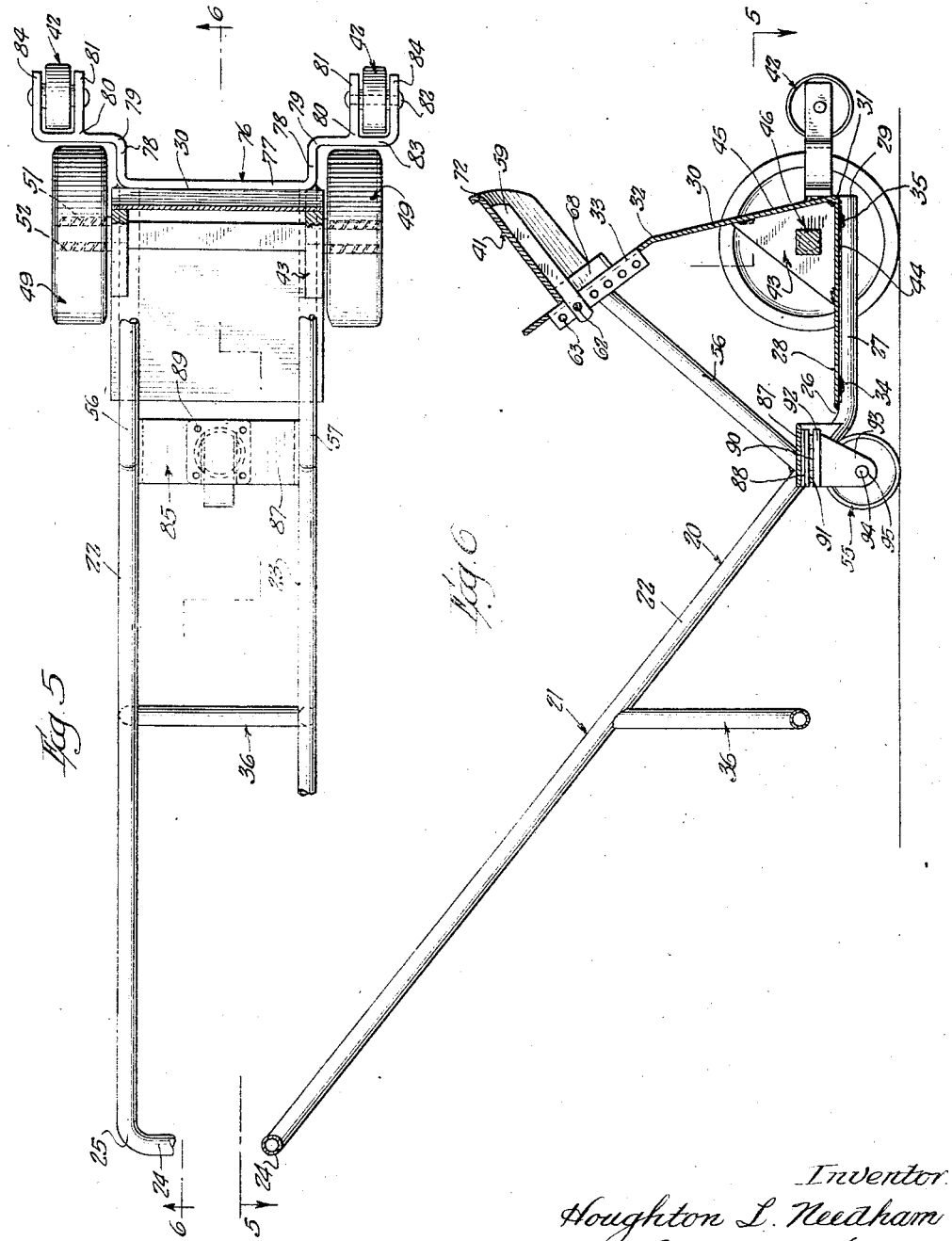

Patented Apr. 8, 1947

2,418,522

UNITED STATES PATENT OFFICE 2,418,522

HAND TRUCK FOR TRANSPORTING CAR WHEELS

Houghton L. Needham, Chicago, Ill.

Application February 27, 1946, Serial No. 650,568

12 Claims. (Cl. 214—65.4)

1

The present invention relates to hand trucks for transporting car wheels, and is particularly concerned with the provision of an improved device for transporting a single car wheel of the type employed on railway cars and locomotives. Such car wheels may vary in their diameter from 33 inches to 40 inches, and Diesel engine wheels vary in weight from 1,200 pounds to 1,500 pounds.

According to the prior art methods of transporting such car wheels, it has been customary for one man to roll the wheel, endeavoring to keep the wheel balanced upon the edge of its wheel flange while still rolling it forward and steering it to the point where it is desired to place or use the wheel.

Another mode of transporting these wheels is by means of ordinary heavy platform trucks, in which case two men are required to handle the wheel in placing the wheel on the truck and taking it off.

Hoists or cranes have been used for handling such wheels, in which case several men are required, one of which mans the hoist or crane and the other attaches the cable or chain to the wheel and guides the wheel to the desired place where it is to be desposited or used.

None of the prior art methods are safe in their operation, and one of the objects of the present invention is the provision of an improved apparatus for transporting car wheels safely, which apparatus is adapted to be used to load the wheel from its usual position of storage and to unload the wheel into the proper position for its further storage or utilization.

Another object of the invention is the provision of a relatively light yet strong wheel transporting carriage which is adapted to be used to load the wheel, to transport the wheel and also to discharge the wheel, by one man who requires no assistance from anyone else in performing these operations with perfect safety.

Another object of the invention is the provision of an improved wheel truck of the class described, which may be manipulated so that it takes on the load of the wheel and so that the operator may pull down upon the handle to lift the wheel into such a position that it cannot be dislodged accidentally or even purposely except in the intended manner of discharge of the wheel.

Still another further object of the invention is the provision of an improved wheel carrying truck of the class described which is self-supporting, stable and steerable when it is loaded with a wheel so that all that is necessary for the transportation of the wheel is for the operator to push or pull the vehicle by means of its handle or by pushing on the wheel itself.

Another object is the provision of an improved wheel transporting truck of the class described, which steers easily and may be propelled easily

2 even though loaded with such heavy loads as the railway car wheels weighing 1,200 pounds to 1,500 pounds or more.

A still further object of the invention is the provision of an improved car wheel transporting truck which may be adjusted to transport wheels of different size within a predetermined range of sizes so that one truck is adapted to handle all of the ordinary sizes of car wheels.

Another object of the invention is the provision of an improved truck or carriage of the class described, which is sturdy yet light, which is provided with a frame and handle by means of which it can be most conveniently manipulated, and with a suitable supporting surface and a retaining means whereby the car wheel is positively secured on the truck during transportation.

Another object of the invention is the provision of a truck structure which is simple yet effective, capable of economical manufacture so that it may be placed at the disposal of a vast number of users, and which may be used for a long period of time without necessity for repair or replacement. Referring to the drawings, of which there are three sheets:

Fig. 1 is a side elevational view of a car wheel transporting truck embodying the invention, shown in connection with a car wheel, the weight of which has just been taken by the truck which is being tilted backwardly into the wheel transporting position;

Fig. 2 is a view in perspective from the left rear of the truck and wheel showing the wheel and truck in the stable wheel transporting position;

Fig. 3 is a front elevational view of the truck in the position of Fig. 2 with the wheel removed;

Fig. 4 is a rear elevational view of the truck in the same position;

Fig. 5 is a fragmentary top plan view of the front end portion of the truck with part of the frame and supporting plate cut away taken on the plane of the line 5—5 of Fig. 6 looking in the direction of the arrows; and Fig. 6 is a side elevational view in partial section on the plane of the line 6—6 of Fig. 5 looking in the direction of the arrows.

The railway car wheels which the present truck is intended to transport are of the type shown in Fig. 1 in dotted lines and indicated by the numeral 10. Such wheels are relatively thick and heavy, and while slightly hollowed out on the outer side 11 the inside 12 is substantially plane. The wheel is provided at its periphery with a bearing flange 13 having a substantially cylindrical outer surface, but which is slightly tapered toward the outside and at its inner side 12.

It is provided with a track engaging flange 14 by means of which the wheels are guided upon a railway track. The wheel is provided with a hub 15 which projects inwardly with respect to the railway car and outwardly at 16, and each of these hub portions is provided with a plane surface 17, 18. The hub has a through bore 19 of substantially cylindrical shape, of suitable size when expanded by heat to receive the cylindrical car axle upon which the wheel is shrunk by tight frictional gripping.

The wheels are customarily stored by being supported on edge on the track flange 14 and resting against a suitable wall, such as a cement abutment at a slight angle which is sufficient to insure the weight of the wheel resting against the wall, but the angle is also relatively small so that there is no possibility of the flange which engages the floor sliding outwardly from the wall or from the next adjacent wheel.

As previously stated, one of the objects of the invention is the provision of a truck which is adapted to transport the wheels safely from one point where they are stored in this position, to another point where they can be discharged and again placed in the same safe position.

Referring to Figs. 1, 5 and 6, the truck, which is indicated in its entirety by the numeral 20, is preferably provided with an elongated handle 21, which may be of substantially inverted U-shape. The handle 21 may have its legs 22, 23 joined to its yoke 24 by substantially right angular easy bends 25, so that the yoke may be substantially straight and of a length adapted to receive both of the hands of the operator when the operator is pulling down on the handle, as shown in Fig. 1, to lift the wheel and to place it in safe position for transportation.

Adjacent the lower end of each leg 22, 23, these legs are bent at an obtuse angle, at 26 so that the lower end portion 27 of each leg may serve as a chassis frame member to carry the wheels of the truck and support the frame work which carries the car wheel.

The angle of the bend at 26 is preferably such that when the end portions 27 of the handle frame are horizontal, as shown in Fig. 6, the upper leg portions 22 and 23 extend diagonally rearwardly and upwardly and so that the yoke 24 is slightly below waist height of a man operating the truck. This is the most convenient and efficient height for pushing or pulling the truck by means of the yoke 24.

The frame portions 27—27 of the chassis are preferably joined by means of a bed plate 28, which may consist of a substantially rectangular sheet of steel of sufficient width to span the two legs 22, 23, and of sufficient length to extend from the bend 26 to the ends 29 of the leg members. Bed plate 28 is preferably integrally joined to an upwardly extending face plate 30 by means of an acute angle 31 at the ends 29 of the legs; and the face plate is preferably bent at an obtuse angle at 32, along a horizontal line so that the wheel supporting plate portion 33 extends rearwardly at an angle to the face plate 30 to keep the car wheel away from the wheels of the truck.

The handle member 21 and all of the other parts of the truck are preferably made of steel, and the handle is preferably made of tubular steel in order that it may be of a maximum strength for a minimum weight.

Bed plate 28 may be secured to handle portions 27 by a plurality of spaced welds such as, for example, a weld 34 near the rear edge of plate 28 and a weld 35 near the ends 29 of the legs on each leg.

The handle member 21 is preferably braced and provided with an additional depending handle 36 on its lower side, this auxiliary handle 36 being also of substantially U-shape, as best shown in Fig. 4. The auxiliary handle 36 also has a yoke 37 joined by easy right angle bends 38 to a pair of legs 39, 40. The ends of the legs 39, 40 are suitably shaped for maximum engagement with the external surface of legs 22, 23 of the main handle 21 to which they are welded so that handle 36 depends in a substantially vertical position when the vehicle has its chassis horizontal, as shown in Fig. 6.

The width of auxiliary handle 36 is preferably the same as the main handle, and the length of the legs of this auxiliary handle is preferably such that its yoke 37 is in a convenient position rearwardly of the car wheel supporting plate portion 33, and at substantially the same horizontal level when the wheel is being loaded, as shown in Fig. 1.

Thus the operator may grasp the main handle yoke 24 with one hand, such as his left hand, while grasping the auxiliary handle yoke 37 with the other hand, to determine the direction in which the car wheel supporting member 41 is to point, so that it may be directed into the bore 19 of a car wheel to be lifted, while the truck is supported upon its auxiliary front wheels 42, as shown in Fig. 1.

The face plate 30 is given additional support and bracing by a pair of substantially triangular gusset plates 43, the lower edge 44 of which fits against the bed plate 28 when the front edge 45 fits against the rear of the face plate 30. Each gusset plate may be welded to the plates 28 and 30 adjacent its upper and rear corners and also preferably at the front corner in the bend 31, thus bracing the upwardly extending face plate 30 and giving it additional support upon the bed plate 28.

The gusset plates 43 may also serve as supporting members for the axle 46, which may be made of a square bar of steel, of suitable size, the bar being turned down to cylindrical form at each end portion 47, 48 and the intermediate square portion 49 having its end shoulders 50 abutting against the inner surfaces of the gusset plates 43 to which the axle may be welded to prevent turning. The main wheels 49, 50 are rotatably supported upon the cylindrical end portions 47, 48 of the axle 46 by means of suitable roller bearings 51, which utilize the central cylindrical surfaces 47, 48 of the shaft as an inner race, and a cylindrical bore 52 in the hub of each wheel for an outer race.

The roller bearings are retained in place by a suitable washer between the hub and the gusset plate 43 on the inside, and by a washer 53 outside the hub, which is engaged by a cotter pin 54 passing through a suitable hole in the shaft. The main wheels 49 and 50, as well as the auxiliary wheels 42 and the caster wheel 55 are preferably made of steel and may be of any suitable construction having a central hub as described, spokes or a web, and a cylindrical bearing flange at the periphery of each wheel.

They are preferably made of steel without any rubber tires as the weight which they carry would otherwise make the truck difficult to push or pull. They are customarily used on relatively smooth cement platforms or floors, and the trucks are moved relatively slowly so that any slight roughness in the surface will not tend to dislodge the load.

The car wheel supporting plate portion 33 is preferably provided with additional support and bracing in the form of a pair of tubular struts 56, 57, which extend from the lower end portions of the legs 22, 23 at substantially right angles, where the struts 56, 57 are welded to the legs 22, 23.

The upper ends of each strut 56, 57 engage the back of the car wheel supporting plate 33 to which these ends are welded, thus providing the car wheel supporting plate 33 with a substantially triangular frame on each side comprising the struts 56, 57, bed frame members 27 and face plate 30.

The car wheel supporting plate portion 33 is preferably formed with an upwardly extending elongated aperture or slot 58, which is preferably substantially rectangular in plan and adapted to pass a supporting bar 59 which carries the car wheel supporting member 41 on its front end, and projects backwardly through the slot 58 to secure the member 41 to the plate 33.

Bar 59 may be substantially rectangular in shape, but preferably has its forward end beveled at 60 like the forward beveled end 61 of the car wheel supporting member 41. At its rear end bar 59 is provided with an aperture for passing a retaining pin 62, this aperture registering with any pair of the apertures 63 located in a pair of metal strips 64 which are spaced from each other sufficiently to pass the bar 59, and which are located on the rear side of plate 33, bordering the slot 58.

The bar 59 supports the car wheel supporting member 41, which is preferably a partially cylindrical thick walled metal member. The cylindrical wall 65 of the member 41 preferably extends over something less than one-half the periphery of a cylinder, and is preferably formed upon such a radius so that its external cylindrical surface 66 is small enough to go into the bore 19 of any car wheel which the truck is intended to transport, with a suitable clearance for convenient insertion.

The rear end 67 of member 41 is provided with a plane edge, the area of which is augmented by a pair of partially annular members 68, 69 which are welded inside the cylindrical member 41 flush with its rear edge 67, but with their ends abutting against the bar 59.

Bar 59 is also welded on the inner surface of the cylindrical member 41 midway between the edges 70, 71 and between arcuate members 68, 69. The bar 59 may be welded adjacent each end of the member 41 on both sides of the bar. The member 41 preferably has its forward end surfaces beveled so that it tapers at its forward end toward a retaining lip 72, which is preferably bent upwardly at substantially right angles.

This provides a retaining shoulder 73 on the rear side of lip 72 for engaging the face 17 of a hub of a car wheel to assure the retention of a car wheel upon the supporting member 41.

As the rear face or edge 67 of member 41 and the annular members 68 and 69 engage flatwardly against the supporting plate 33, when the aperture in the bar 59 registers with apertures 63 in the plates 64, only a single pin 62 is sufficient to secure the supporting member 41 on plate 33.

As the bar 59 has its flat sides engaged between the edges of slot 58 and between the plates 64, the member 41 is held against rotation and rotation is also prevented by the transverse pin 62.

Pin 62 preferably has a pointed end 74 and has its opposite end provided with an axially bent portion 75 to be used as a handle in placing or withdrawing the pin.

The car wheel supporting member 41 is preferably disposed in such a height that when the carriage is in the position of Fig. 1 the wheel 10 is just lifted off its rim 14. This adjustment may be made by sliding the bar 59 upward or downward in the slot 58 and securing it in proper position by means of the pin 62. Thus the carriage may be tilted upward until the lip 72 is in position to pass forward into the bore 19.

In order to facilitate this movement and to provide for a shift from one point of pivotal support while the wheel is being loaded, to another on which the wheel is safely supported, the truck is preferably provided with the two auxiliary front wheels 42. These are preferably supported upon a forwardly extending frame 76, which may be made of a bar or strip of metal of rectangular cross section.

Frame 76 may have a straight yoke 77 which may be welded adjacent each of its ends and a plurality of intermediate points, on each edge of the strap portion 77 to the face plate 30. At each end of the portion 77, the strap of which frame 76 is made extends forwardly at right angles, these portions serving to clear the main wheels 49 and being indicated by the numeral 78.

The strap is then bent laterally at right angles at 79 and forwardly at right angles at 80, and provided with a forward wheel bearing flange 81 which has an aperture for a stub shaft 82. Another piece of strap may be welded to the corner 80 and may have a laterally extending portion and a forwardly extending wheel bearing flange 84, which has an aperture for the stub shaft 82.

Wheels 42 may be similar in construction to main wheels 49, but much smaller in size as they are only intended to bear the weight of the car wheel while it is being loaded or unloaded. The wheels 42 may also be supported upon shafts 82 by means of suitable roller bearings exactly as described with respect to wheels 49.

The yoke 77 of frame 76 is preferably welded to the face plate 30 in such manner that the forwardly extending bearing plates 81, 84 extend horizontally forward of the wheel axis 46. The elevation of the frame 76 on plate 30 is preferably such that when the truck has its chassis 27, 28 horizontal, wheels 42 are lifted well off the floor, but the handle 21 may be tilted upward until the truck is wholly supported upon the wheels 42, when the car wheel supporting member 41 is tilted forwardly and downwardly to pass into the bore 19 of a car wheel.

The chassis is preferably provided with a caster supporting plate 85, which may consist of a substantially rectangular body portion wide enough to support a caster bearing plate and long enough to span the distance between the legs 22, 23.

The caster supporting plate 85 is preferably secured to the legs 22, 23 just rearwardly of the obtuse bend 26 and, therefore, this plate is preferably provided with a pair of triangular downwardly extending supporting flanges 86 which engage inside the legs 22, 23 to which they are welded along the lower edges of flanges 86. This supports the body 87 of plate 85 in horizontal position when the truck is in the position of Fig. 6.

An upper caster bearing plate 88 may be secured to the lower side of body 87 by means of a plurality of screw bolts 89 located at the four corners of the caster bearing plate. Caster bearing plate 88 has a central aperture for receiving the pivot shaft 90 of the caster, and has a circular race groove for receiving the balls 91. The caster has an upper bearing plate 92 provided with a similar groove, and has a pair of depending bearing flanges 93 with aligned shaft bores 94 for receiving the stub shaft 95.

Stub shaft 95 may support the caster wheel 55 by means of roller bearings engaging the outside of shaft 95 and the inside of the hub bore of the wheel 55 in such manner that the wheel 55 may rotate freely.

Vertical pivot shaft of the caster 92 is located eccentrically with respect to the shaft 95 so that the caster wheel 55 may follow and be guided by the carriage frame, and may turn to follow the direction in which the carriage is being pushed or pulled.

At the upper end of the pivot shaft 90 there is a washer and transverse cotter pin or other retaining means, and the shaft 95 may have a head at one end and a cotter pin at the other or may be riveted over at its ends.

The operation of the car wheel transporting truck is as follows:

The car wheel supporting member 41 is preferably adjusted to be at such a height that it can be conveniently inserted into the bore of a car wheel which is standing in slightly tilted position upon the edge of its wheel flange. The operator may then grasp the end of the handle at 24 and he may lift the handle until the truck is supported wholly upon its small auxiliary front wheels 42. In this position the handle is lifted higher than shown in Fig. 1 so that the lip 72 at the end of the car wheel supporting member 41 may be depressed, and the member 41 extends diagonally downward and forward.

The operator may then grasp the handle 37 with the other hand and may shove the carriage forward until the member 41 passes through the bore 19 of a car wheel and until the car wheel has its face 18 engaging the plate 33.

The handle 21 is then tilted backward while the foot of the operator may be placed upon the caster supporting plate 85, as shown in Fig. 1, to push the carriage forward and hold it in firm engagement with the wheel 10. As the carriage tilts backward the wheels 42 roll forward and the car wheel 10 is lifted to the position of Fig. 1.

As the handle 21 is pulled farther down from the position of Fig. 1 the weight shifts from the forward wheels 42 to the main wheels 49 and the car wheel 10 tilts backward against the plate 33 on the member 41 until it is supported in the position of Fig. 2, when the chassis is horizontal and supported upon the two main wheels 49 and caster wheel 55.

In some embodiments of the invention it is not necessary to have the upwardly extending lip 72 or retaining shoulder 73, but this is an additional desirable safety feature, positively preventing the member 41 from sliding backward out of the bore 19 of a car wheel when member 41 engages the top of the bore 19.

It will be observed that when the hub face engages the plate 33, as shown in Fig. 1, the car wheel clears the wheels 49 which are rearwardly disposed and also the wheels 42 which are downwardly and rearwardly disposed with respect to the periphery of the car wheel 10.

It should also be observed that the car wheel is supported substantially at its center of gravity and that the truck wheels are far enough apart so that there is no danger of the truck tipping. Also the car wheel rests flatly against the surface of plate 33 so that it is stable and the great weight of the car wheel assists in holding it in position, impaled upon the supporting member 41.

The car wheel may then be transported by merely pushing or pulling upon the handle 21, and it may be wheeled until the lower edge of the car wheel is adjacent the wall or other wheel against which it is to be tilted.

Then the operator may lift the handle 21 by means of the yoke 24 until the small front wheels 42 engage the ground and the main wheels 49 are lifted from the ground to the position of Fig. 1. This unloading motion may be assisted by the operator grasping the yoke 37 of handle 36, which is in a more convenient position for lifting, as soon as the handle 21 has been elevated a certain amount.

As the center of gravity of the car wheel 10 passes over the point of load support 96 where the little wheels 42 engage the floor 97, there may be a tendency for the wheels 42 to roll backward, and this may be resisted by the operator by placing his foot on the caster supporting plate 85, as shown in Fig. 1, during the unloading operation in resisting the forces tending to tip the truck in a clockwise direction while unloading.

A continued motion of the handle 21 in a clockwise direction will result in the wheel 10 being placed upon its flange 14 on the ground at the proper distance from the adjacent wheel or wall, against which the wheel 10 may be tilted into a stable storage position. Further tilting of the handle 21 in a clockwise direction about the pivotal support 96 for wheels 42 will cause the member 41 to be depressed in the bore 19 until lip 72 will clear the upper surface of bore 19.

The operator may then draw the truck horizontally backward by means of handles 37 and 24 until the member 41 is withdrawn from the bore 19 of the wheel 10, leaving the wheel in the same position in which it was originally found, but after being transported to a new place for use or storage.

It will thus be observed that I have invented an improved truck for transporting car wheels, by means of which one man may manipulate the truck so that the wheel is loaded and carried in stable position upon the truck.

Thereafter he may transport it safely to any desired point with a minimum amount of effort and without any possibility of accident.

At the point of discharge the wheel may be unloaded by one man who need only so manipulate the truck that the wheel is brought to the right place and tilted over into the same position in which it was found, and all of the operation may be conducted with a minimum amount of labor and in the shortest possible time.

The accidents which were quite common with the manual methods of transporting car wheels, according to the prior art, are practically eliminated by the use of my truck, and the factor of safety with its use is even greater than that which is present in the transporting methods which require the use of an expensive hoist or crane and the employment of several men.

The present truck may be manufactured at a very low cost and it may be used for a long period of time without likelihood of damage of any of its parts. The saving in labor is important, but far more important is the assurance of safety for the laborers in transporting these heavy car wheels.

The present truck is simple in construction and its manipulation is easily learned so that unskilled labor may be employed in transporting the wheels. It may be manufactured at a low cost and thus may be purchased, even where car wheels are transported infrequently, in view of its great safety.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a wheeled vehicle for transporting railway car wheels or the like, the combination of a chassis provided with wheels, and a handle member extending rearwardly and upwardly from said chassis, with a wheel supporting member extending forwardly and upwardly and adapted to be inserted into the bore of a car wheel when the vehicle has its handle tilted upwardly whereby the wheel supporting member may lift the wheel from its edge into the position in which the weight of the wheel keeps the wheel impaled upon said wheel supporting member for safe transport upon said vehicle, said chassis including a pair of main supporting wheels located forwardly of the chassis under said car wheel supporting member, about which the chassis may be tilted, and said chassis including a rearwardly located stabilizing wheel for supporting a minor part of the load on the vehicle, said latter wheel comprising a caster wheel mounted upon a vertical axis on said chassis, said vertical axis being eccentric with respect to the wheel axis, whereby the caster wheel is steered by the force applied to the propulsion of the chassis.

2. In a wheeled vehicle for transporting railway car wheels or the like, the combination of a chassis provided with wheels, and a handle member extending rearwardly and upwardly from said chassis, with a wheel supporting member extending forwardly and upwardly and adapted to be inserted into the bore of a car wheel when the vehicle has its handle tilted upwardly whereby the wheel supporting member may lift the wheel from its edge into the position in which the weight of the wheel keeps the wheel impaled upon said wheel supporting member for safe transport upon said vehicle, said car wheel supporting member having an upwardly extending portion provided with a retaining shoulder for assuring the retention of the wheel on said member during loading.

3. In a wheeled vehicle for transporting railway car wheels or the like, the combination of a chassis provided with wheels, and a handle member extending rearwardly and upwardly from said chassis, with a wheel supporting member extending forwardly and upwardly and adapted to be inserted into the bore of a car wheel when the vehicle has its handle tilted upwardly hereby the heel supporting member may lift the wheel from its edge into the position in which the weight of the wheel keeps the wheel impaled upon said wheel supporting member for safe transport upon said vehicle, said car wheel supporting member being adjustable in elevation on said chassis whereby the vehicle is adapted to facilitate the loading and unloading and transportation of car wheels of different sizes.

4. In a wheeled vehicle for transporting railway car wheels or the like, the combination of a chassis provided with wheels, and a handle member extending rearwardly and upwardly from said chassis, with a wheel supporting member extending forwardly and upwardly and adapted to be inserted into the bore of a car wheel when the vehicle has its handle tilted upwardly whereby the wheel supporting member may lift the wheel from its edge into the position in which the weight of the wheel keeps the wheel impaled upon said wheel supporting member for safe transport upon said vehicle, the said handle member being provided intermediate the chassis and its end with an auxiliary handle located to be positioned for impressing a forward thrust on the vehicle by means of the hand of the operator when the car wheel supporting member is tilted to the insertion position.

5. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said car wheel supporting member comprising a partially cylindrical metal member adapted to engage the inside of a car wheel bore.

6. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said framework including a forwardly and backwardly extending face plate provided with a rearwardly extending portion adapted to engage the face of a wheel at said wheel supporting member, said wheel supporting member being mounted upon a bar and said bar projecting through said framework and having a plurality of points of support at different elevations, for wheels of different sizes.

7. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said transverse frame member and framework comprising a metal plate joining the chassis portions and bent backwardly and upwardly and provided with a backwardly tilted plane portion for supporting the car wheel in position to clear the chassis wheels, said rearwardly extending portion of said plate being joined to said handle portion by rearwardly extending struts.

8. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said handle portion being joined by a caster supporting plate and said caster supporting plate carrying a caster pivoted for rotation about a vertical axis and having a rearwardly pivoted wheel.

9. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said handle portion being joined by a caster supporting plate and said caster supporting plate carrying a caster pivoted for rotation about a vertical axis and having a rearwardly pivoted wheel, said supporting framework comprising a metal plate having a lower portion joining the legs of said U-shaped metal member, extending upwardly therefrom, and having a plate portion for engaging the lower side of a car wheel about said car wheel supporting member.

10. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said handle portion being joined by a caster supporting plate and said caster supporting plate carrying a caster pivoted for rotation about a vertical axis and having a rearwardly pivoted wheel, said supporting framework comprising a metal plate having a lower portion joining the legs of said U-shaped metal member, extending upwardly therefrom, and having a plate portion for engaging the lower side of a car wheel about said car wheel supporting member, said plate portion being joined to and supported from said chassis portion by downwardly extending struts joining said plate portion and the legs of said U-shaped member.

11. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said handle portion being joined by a caster supporting plate and said caster supporting plate carrying a caster pivoted for rotation about a vertical axis and having a rearwardly pivoted wheel, said framework including a base plate joining the legs of said U-shaped member, a transverse bar carried forwardly of said base plate and forwardly of said wheels, said bar having forwardly extending wheel supporting portions, and a pair of smaller wheels carried by said wheel supporting portions, to be located under and at both sides of a car wheel during the insertion of said wheel support member into the bore in said car wheel.

12. A car wheel transporting truck comprising a combined chassis and handle formed of a substantially U-shaped elongated metal member, said member having an obtuse bend between a chassis portion and a handle portion and said chassis portion being joined by a transverse frame member, wheels rotatably mounted upon said chassis portion, a supporting framework mounted upon said chassis portion and an upwardly and forwardly extending car wheel supporting member carried by said framework, for insertion into the bore of a car wheel to be carried on said framework, said handle portion being joined by a caster supporting plate and said caster supporting plate carrying a caster pivoted for rotation about a vertical axis and having a rearwardly pivoted wheel, said framework including a base plate joining the legs of said U-shaped member, a transverse bar carried forwardly of said base plate and forwardly of said wheels, said bar having forwardly extending wheel supporting portions, and a pair of smaller wheels carried by said wheel supporting portions, to be located under and at both sides of a car wheel during the insertion of said wheel support member into the bore in said car wheel, said U-shaped metal member being provided intermediate the chassis and its yoke, which serves as a handle, with an intermediate depending U-shaped member, the yoke of which serves as a second handle, to be engaged by the operator while holding the first-mentioned yoke in controllably moving the truck forward, with the car wheel supporting member in position to be inserted in a car wheel.

HOUGHTON L. NEEDHAM.

REFERENCES CITED

The following references are of record in the file of this patent:

UNITED STATES PATENTS

| Number | Name | Date |
| --- | --- | --- |
| 1,012,139 | King | Dec. 19, 1911 |
| 1,573,840 | Lyday | Feb. 21, 1926 |
| 2,345,729 | Claus et al. | Apr. 4, 1944 |
| 2,361,674 | Zeindler | Oct. 31, 1944 |
| 2,404,310 | McCallick | July 16, 1946 |

FOREIGN PATENTS

| Number | Country | Date |
| --- | --- | --- |
| 512,982 | British | Oct. 2, 1939 |